United States Patent [19]

Gaytan et al.

[11] Patent Number: 5,633,870
[45] Date of Patent: May 27, 1997

[54] METHOD AND APPARATUS FOR CONTROLLING DATA FLOW THROUGH AN ATM INTERFACE

[75] Inventors: Andre J. Gaytan, Union City; Rasoul M. Oskouy, Fremont, both of Calif.

[73] Assignee: Sun Microsystems, Inc., Mountain View, Calif.

[21] Appl. No.: 499,197

[22] Filed: Jul. 7, 1995

[51] Int. Cl.⁶ ........................................ H04J 3/16
[52] U.S. Cl. .................. 370/235; 370/395; 370/412; 370/468; 395/200.2
[58] Field of Search ...................... 370/60, 60.1, 61, 370/94.2, 58.1, 58.2, 58.3, 85.7, 94.1, 99, 82, 83, 13, 17, 110.1, 85.13, 84, 79; 364/977.5; 395/200.2

[56] References Cited

U.S. PATENT DOCUMENTS

| | | | |
|---|---|---|---|
| 5,274,768 | 12/1993 | Traw et al. | 370/60.1 |
| 5,319,754 | 6/1994 | Meinecke et al. | 395/325 |
| 5,379,297 | 1/1995 | Glover et al. | 370/84 |
| 5,412,655 | 5/1995 | Yamada et al. | 370/60.1 |
| 5,414,707 | 5/1995 | Johnston et al. | 370/94.1 |
| 5,450,411 | 9/1995 | Heil | 370/60.1 |
| 5,509,001 | 4/1996 | Tachibana | 370/60.1 |
| 5,515,363 | 5/1996 | Ben-Nun et al. | 370/60.1 |

*Primary Examiner*—Wellington Chin
*Assistant Examiner*—Huy D. Vu
*Attorney, Agent, or Firm*—Blakely Sokoloff Taylor & Zafman

[57] ABSTRACT

A method and network interface for controlling the flow of data between a and an ATM network is provided. The network interface resides on an ATM interface and includes a state machine for each channel supported by the ATM interface. The state machine moves from state to state based on the contents of a local buffer, indications that data for the channel is ready to be transferred from the host computer to the local buffer, and the status of operations that transfer data for the channel from the host computer to the local buffer. The ATM interface includes a DMA unit and a segmentation unit that operate responsive to the states of the various state machines to avoid inefficient transfer operations. Specifically, the DMA unit does not attempt to move data for a channel from the host computer to the local buffer if the state of the state machine for the channel indicates that (1) there is no more data in the host computer for the channel or (2) there is no more room in the local buffer to receive data for the channel from the host computer. The segmentation unit does not attempt to transmit cells for a channel when the state of the state machine for the channel indicates that the local buffer does not contain enough data for the channel to construct a cell for the channel.

25 Claims, 5 Drawing Sheets

METHOD AND APPARATUS FOR CONTROLLING DATA FLOW THROUGH AN ATM INTERFACE

FIELD OF THE INVENTION

The present invention relates to Asynchronous Transfer Mode (ATM) communication, and more specifically, to a method and apparatus for controlling the flow of data between memory on a host computer and an ATM network.

BACKGROUND OF THE INVENTION

In an ATM network, data flows from memory on a host computer ("host memory") through an ATM interface to the ATM network. The ATM interface must package the stream of data it receives from the host memory into ATM cells prior to delivering the data to the ATM network. The stream of data may include data that is to be sent on numerous different channels within the ATM network. Therefore, the ATM interface must process and package the data based on the channels on which the data is to be transmitted.

FIG. 3 illustrates a typical ATM interface 100 that connects a host computer 101 with an ATM network 103. ATM interface 100 may either reside on the host computer 101 or on an interface card which plugs into a slot in the host computer 101. ATM interface 100 includes a DMA unit 102, a local buffer 104, a segmentation unit 106 and cell timers 108.

The DMA unit 102 is coupled to a host memory 116 on the host computer 101 over a system bus 114. The DMA unit 102 moves data from the host memory 116 to the local buffer 104. The local buffer 104 temporarily holds the data until the data is retrieved by the segmentation unit 106. The local buffer 104 couples the DMA unit 102 to the segmentation unit 106. The segmentation unit 106 is coupled between the local buffer 104 and the ATM network 103. Segmentation unit 106 retrieves the data from local buffer 104, packages the data into ATM cells, and transmits the ATM cells to ATM network 103.

The DMA unit 102, local buffer 104 and segmentation unit 106 constitute the data path between the host memory 116 and the ATM network 103. This same data path is used for all data sent from the host computer 101 through ATM interface 100 to the ATM network 103. However, the parameters which control the data flow between the host computer 101 and the ATM network 103 may be different for each channel. Thus, segmentation unit 106 may have to process data for one channel based on different parameters than data for another channel.

For example, each of the connections in an ATM network is typically set up with a desired data transmission rate. ATM interface 100 attempts to transmit cells for each connection at a rate which matches the desired transmission rate for the connection. In the illustrated ATM interface 100, the transmission rates for the various channels are controlled by cell timers 108. Each channel has a cell timer. Each cell timer transmits a cell transmit request to segmentation unit 106 to indicate that a cell should be transmitted on the channel that corresponds to the cell timer. Each cell timer is configured to transmit such requests at a rate that corresponds to the desired transmission rate associated with its channel. The various cell timers 108 compete with each other to request the segmentation unit 106 to transmit cells for their channels.

The efficiency of ATM interface 100 may be adversely affected if DMA unit 102 and segmentation unit 106 do not work together to ensure a smooth flow of data. For example, the bandwidth of the ATM network 103 will be underutilized if the segmentation unit 106 spends time trying to transmit data from a channel for which insufficient data is currently stored in local buffer 104. As mentioned above, the cell timers 108 transmit requests to the segmentation unit 106 to transmit cells for their corresponding channels. Once a request is received by segmentation unit 106, the segmentation unit 106 must retrieve a number of cell parameters for that particular channel. However, when a cell timer makes a request, the cell timer does not know if there is enough data stored in local buffer 104 to construct a cell for its channel. The segmentation unit 106 will waste time if upon reading those cell parameters, it is discovered that the local buffer 104 does not contain sufficient data for the channel to construct a cell for the channel.

Lack of cooperation between the segmentation unit 106 and DMA unit 102 may also lead to inefficiency in data transfers between the host memory 116 and local buffer 104. Specifically, each channel is allotted some fixed amount of memory in the local buffer 104. If the DMA unit 102 fills the memory for each channel randomly, the DMA unit 102 may begin to fill the local buffer memory for a channel even though the local buffer memory for that channel is almost full. When this occurs, the DMA unit 102 is only able to move a small amount of data into the local buffer. The DMA unit 102 would then have to save all the parameters for that channel and retrieve new parameters for another channel before beginning another data movement. When the DMA unit 102 is only able to move a small amount of data before switching to another channel, the DMA unit 102 is less efficient.

When there is data in the host memory 116 that is to be transmitted through ATM interface 100 to the ATM network 103, the host computer 101 sends signals to the ATM interface 100 indicating the data to be transmitted. When these signals arrive, the ATM interface 100 may not be able to immediately perform the specified transfer. For example, the DMA unit 102 of the ATM interface 100 may be busy transferring data from one channel, the segmentation unit 106 may be busy transmitting a cell from another channel, while signals from the host computer 101 indicate that data is to be transferred from host memory 116 to local buffer 104 for yet another channel. Under these conditions, the ATM interface 100 cannot immediately perform the data transfer for the host memory 116, but must remember that the data is to be transferred. Consequently, when DMA unit 102 becomes available, the appropriate data may be transferred from the host memory 116 to the local buffer 104.

SUMMARY OF THE INVENTION

A method and apparatus for controlling the flow of data between a host computer and an ATM network is provided. The apparatus resides on an ATM interface and includes a state machine for each channel supported by the ATM interface. The state machine moves from state to state when (1) an operation is scheduled for transferring data for the channel from the host computer to a local buffer, (2) the host computer indicates that data for the channel is ready to be transferred from the host computer to the local buffer, (3) all of the data in the host computer that is to be sent on the channel has been copied into the local buffer, (4) a portion of the local buffer that is allocated for the channel becomes full before all of the data in the host computer that is to be sent on the channel has been copied into the local buffer, (5) the local buffer contains an mount of data for the channel that exceeds a first predetermined threshold, or (6) the local buffer contains an amount of data for the channel that falls below a second predetermined threshold.

The ATM interface includes a DMA unit and a segmentation unit that operate responsive to the states of the various state machines to avoid inefficient transfer operations. Specifically, the DMA unit does not attempt to move data for a channel from the host computer to the local buffer if the state of the state machine for the channel indicates that (1) there is no more data in the host computer for the channel or (2) there is no more room in the local buffer to receive data for the channel from the host computer. The segmentation unit does not attempt to transmit cells for a channel when the state of the state machine for the channel indicates that the local buffer does not contain enough data for the channel to construct a cell for the channel.

According to one aspect of the invention, an apparatus for controlling a flow of data between a host computer and a network is provided. The apparatus includes a local buffer, a timer, a channel flow controller and a segmentation unit. The local buffer stores data to be transmitted onto the network.

The timer corresponds to a channel. The timer is configured to generate cell transmit requests. The channel flow controller is coupled to the timer. The channel flow controller generates an enable signal associated with the channel. The channel flow controller generates the enable signal when the local buffer contains enough data for the channel for a cell to be constructed for the channel.

The segmentation unit is coupled to the timer, the channel flow controller and the local buffer. The segmentation unit reads data from the local buffer and transmits the data in cells onto the network on the channel in response to the cell transmit requests from the timer. The segmentation unit responds to the cell transmit requests from the timer if and only if the channel flow controller is generating the enable signal. Because the enable signal is generated when the local buffer contains enough data for a cell to be constructed for the channel, the segmentation unit does not waste time attempting to transmit cells for a channel when there is not enough data to create cells for the channel.

The apparatus further includes a DMA unit that transfers data from the host computer to the local buffer. Rather than perform the transfers randomly, the DMA unit performs transfers by servicing entries stored in a scheduler queue. Each entry in the scheduler queue identifies a channel for which the DMA unit is to transfer data from the host computer to the local buffer. An entry for a channel is placed in the scheduler queue when the amount of data for the channel in the scheduler queue falls below a predetermined threshold. Because the DMA unit only services the channels identified in the scheduler queue, the DMA unit never begins a transfer operation for channels whose portion of the local buffer is almost full.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
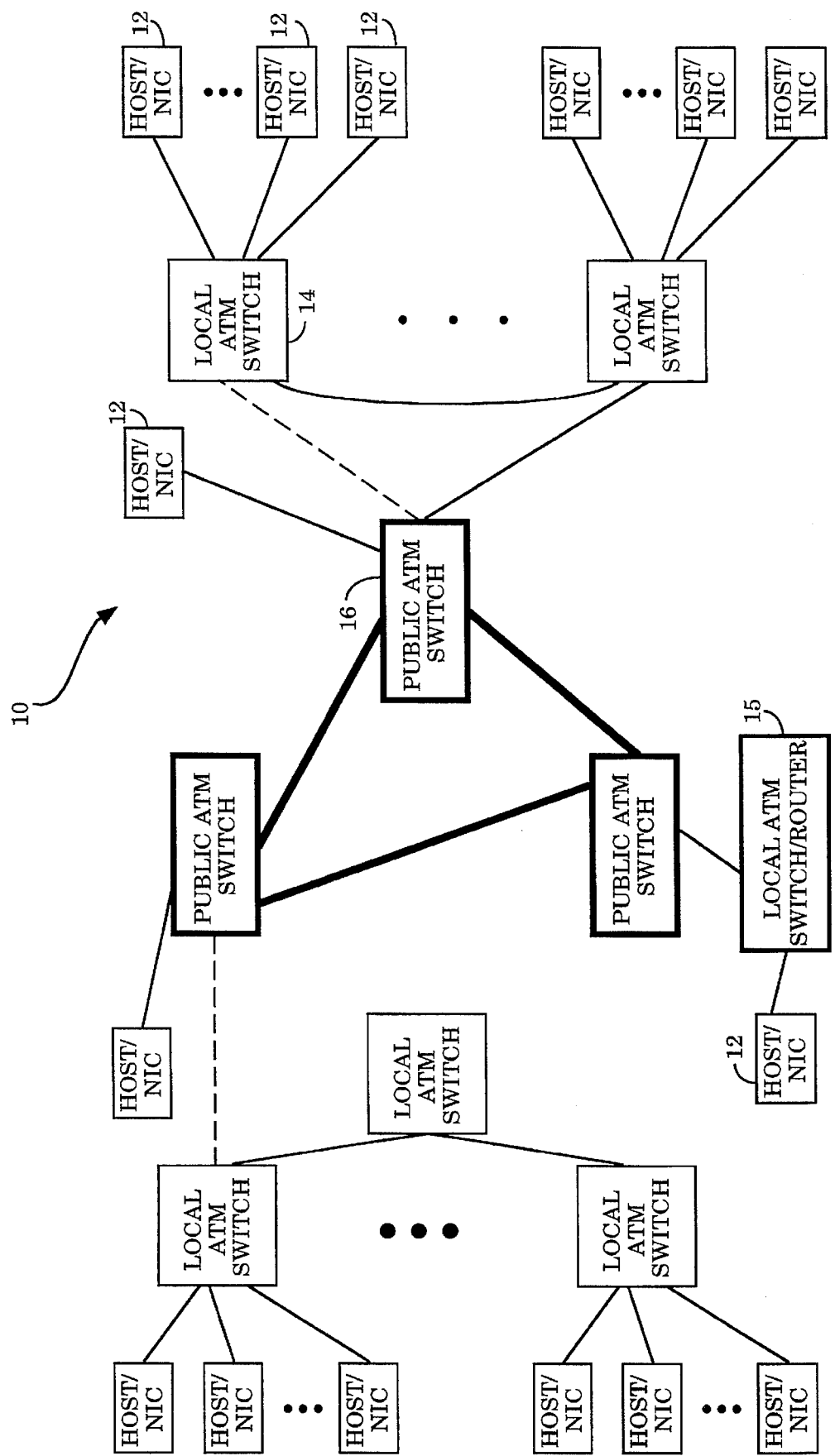
FIG. 1 illustrates an exemplary computer system network incorporating the ATM network interface circuit which utilizes the method and apparatus of data transfer coordination of the present invention.

FIG. 1 illustrates an exemplary computer system network incorporating the asynchronous transfer mode (ATM) network interface circuit of the present invention. The computer system network 10 includes host computer systems (not shown) which incorporate one or more of the ATM network interface circuits (NIC) 12. The NICs 12 are coupled through a local ATM switch 14 to a public ATM switch 16 to enable asynchronous transfer of data between host computer systems coupled to the network 10. Alternately, the NICs 12 can be coupled directly to the public ATM switch 16. As shown in FIG. 1, the computer system network 10 may also include computer systems which incorporate the use of a Local Area Network ("LAN") emulation 15 which serves as a gateway for connecting other networks such as Ethernet or token ring networks 17 which utilize the ATM network as a supporting framework.

Figure 2:
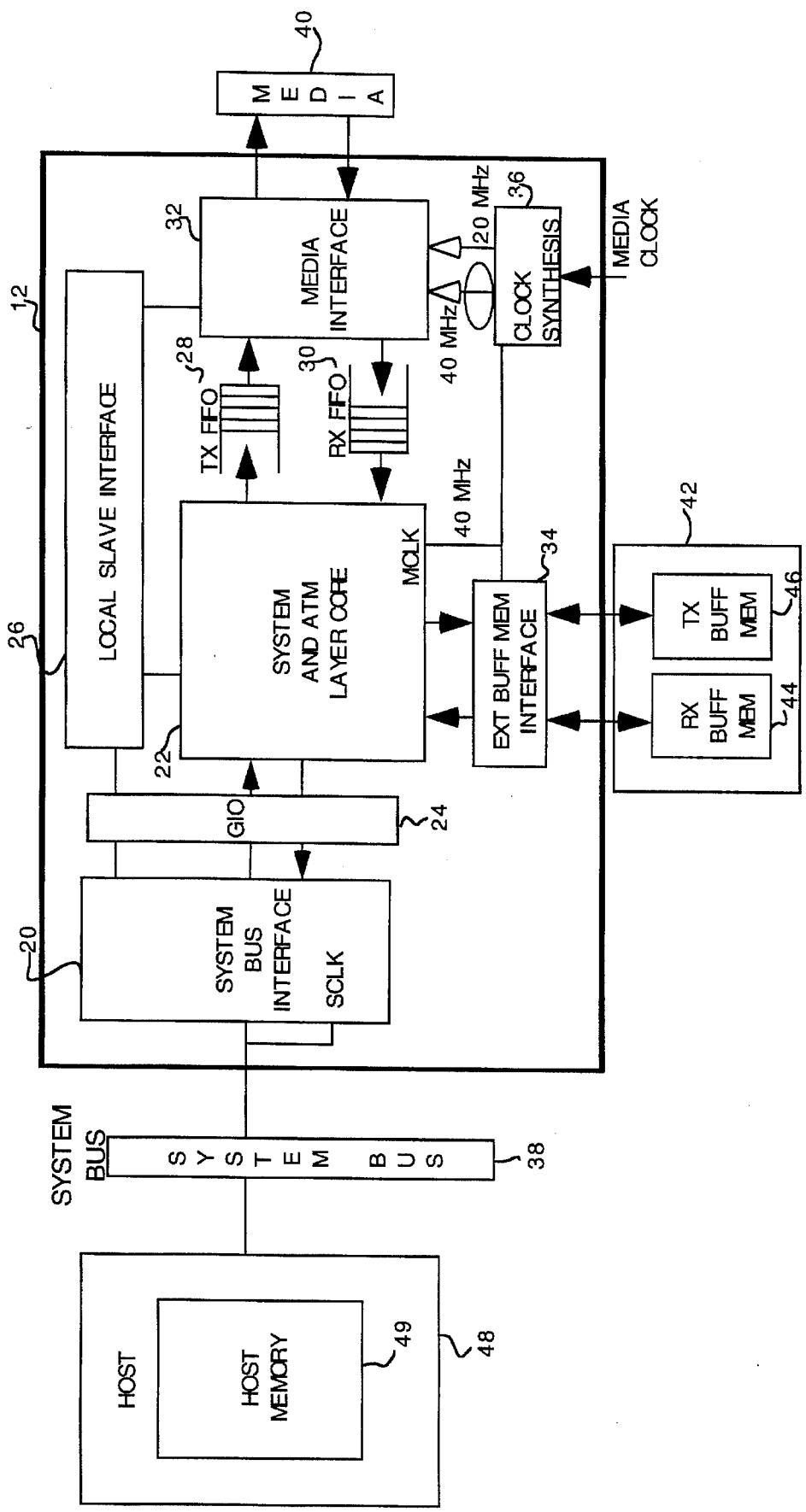
FIG. 2 is a simplified system diagram illustrating the architecture of an ATM network interface circuit in accordance with a preferred embodiment of the present invention.
Figure 3:
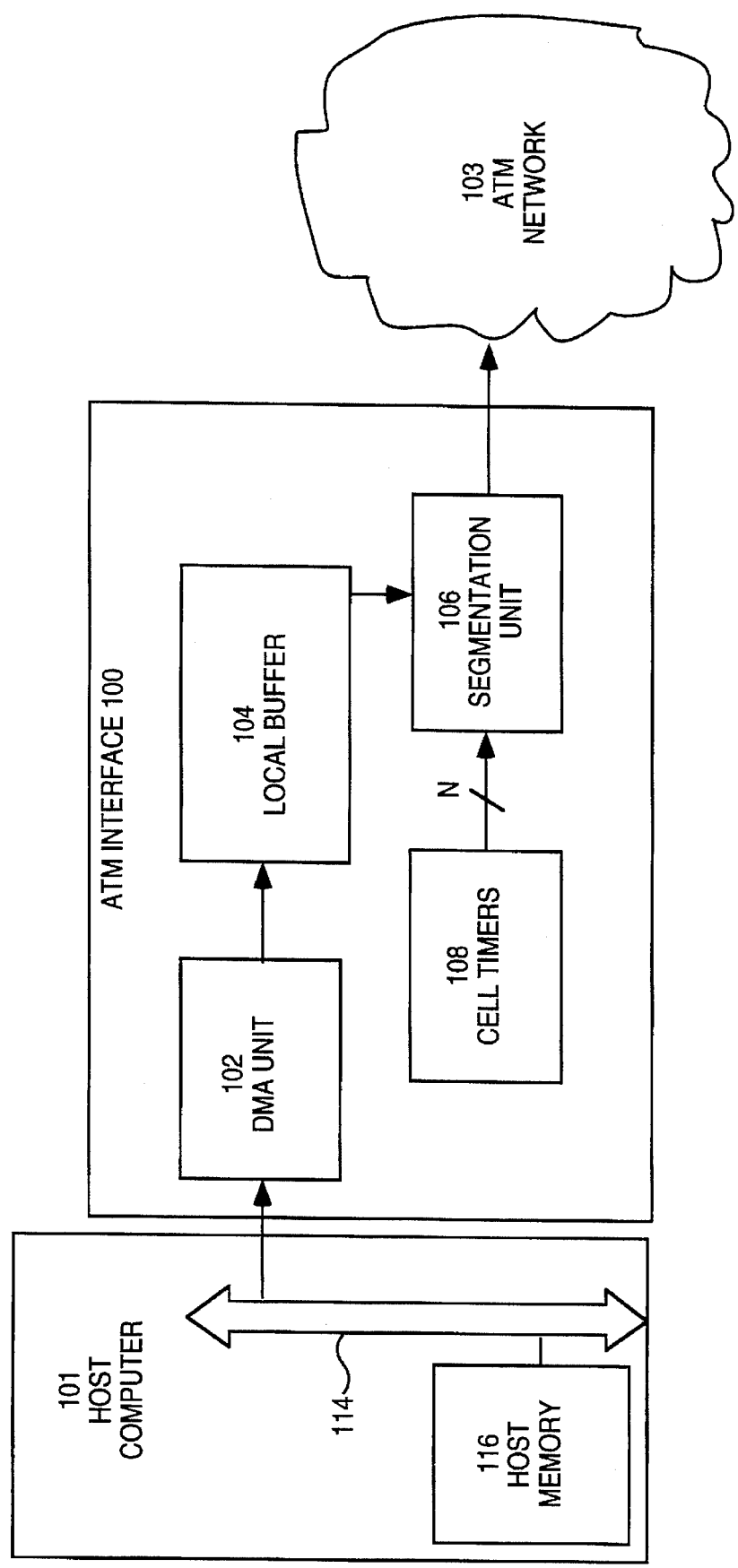
FIG. 3 illustrates a typical ATM interface for connecting a host computer with an ATM network.

FIG. 2 is a simplified system diagram illustrating the architecture of the ATM NIC 12 in accordance with a preferred embodiment of the present invention. The ATM NIC 12 interfaces a host computer system 48 coupled through system bus 38 to the network media 40 operating in accordance with the ATM protocol.

The ATM NIC 12 shown includes a System Bus interface 20, a Generic Input/Output ("GIO") interface 24, a System and ATM Layer Core 22, a Local Slave interface 26, a transmit (TX) FIFO 28, a receive (RX) FIFO 30, a Media interface 32, an External Buffer Memory Interface 34 and a clock synthesis circuit 36.

Together, the elements 20–36 of NIC 12 cooperate to transfer data between the host computer 48 and the other computers in the network through multiple, dynamically allocated channels in multiple bandwidth groups. Collectively, the elements of the network interface circuit 12 function as a multi-channel intelligent direct memory access (DMA) controller coupled to the System Bus 38 of the host computer system 48. In a preferred embodiment, multiple transmit and receive channels are serviced as virtual connections utilizing a full duplex 155/622 Mbps physical link. Multiple packets of data, subscribed to different channels over the System Bus 38 to the external buffer memory 42, via the External Buffer Memory Interface 34, are segmented by the System and ATM Layer Core 22 into transmit cells for transmission to the Media 40 through Media interface 32. The Core 22 also comprises reassembly logic to facilitate reassembly of the received cells to packets.

The TX and RX FIFOS 28, 30, coupled between the Core 22 and the Media Interface 32, are used to stage the transmit and receive cell payloads of the transmit and receive packets respectively. The Media Interface 32 transmits and receives cells to the Media 40 of the network, driven by clock signals provided by Clock Synthesis Circuit 36. Preferably the Media, and therefore the Media interface 32, conforms to the Universal Test and Operations Physical Interface for ATM ("UTOPIA") standard, as described by the ATM Forum Ad Hoc specification. To conform to the UTOPIA specification, the clock synthesis circuit 36 provides either a clock signal of 20 MHz or 40 MHz to enable the Media interface 32 to support a byte stream at 20 MHz for 155 Mbps or a 16 bit stream at 40 MHz for a 622 Mbps data stream.

In the present embodiment, the Media Interface 32 receives 52-byte data cells each having a 4-byte cell header and a 48-byte payload from the TX FIFO 28. The Media Interface 32 inserts a checksum as a fifth byte to the cell header into each cell prior to providing the 53-byte data cell to the Media 40. Conversely, when the Media Interface 32 receives cells from the Media 40, it examines the checksum in the fifth byte of each cell to determine if the checksum is correct. If so, the byte representing the checksum is stripped from the cell and the cell is forwarded to the RX FIFO 30. Otherwise, the entire cell is dropped.

The System Bus Interface 20 and GIO interface 24 insulate the host computer system 48 from the specifics of the transfer to the Media 40. Furthermore, the Core 22 is insulated from the specifics of the system bus 38 and host specifics. In the present preferred embodiment, the System Bus is an S-Bus, as specified in the Institute of Electronics and Electrical Engineers ("IEEE") standard 1496 specification. The System Bus Interface 20 is configured to communicate in accordance with the specifications of the system bus, in the present illustration, the S-Bus. It is contemplated that the System Bus Interface 20 can be configured to conform to different host computer system busses. The System Bus Interface 20 is also configured to transfer and receive data in accordance with the protocols specified by the GIO interface 24. The GIO interface 24 provides a singular interface through which the Core 22 communicates with the host computer. Thus, the Core 22 does not change for different embodiments of the NIC 12 which interface to different host computer systems and busses.

The host computer system 48 includes host memory 49 which contains data packets and pointers to the packets being transmitted and received. As noted previously, the NIC 12 also shields the cell delineation details of asynchronous transfer from the applications running on the host computer system. For present purposes, it is assumed that software running on the host computer system 48 manage transmit and receive data using wrap around transmit and receive rings with packet interfaces as is well known in the art.

FLOW CIRCUITRY OVERVIEW

Figure 4:
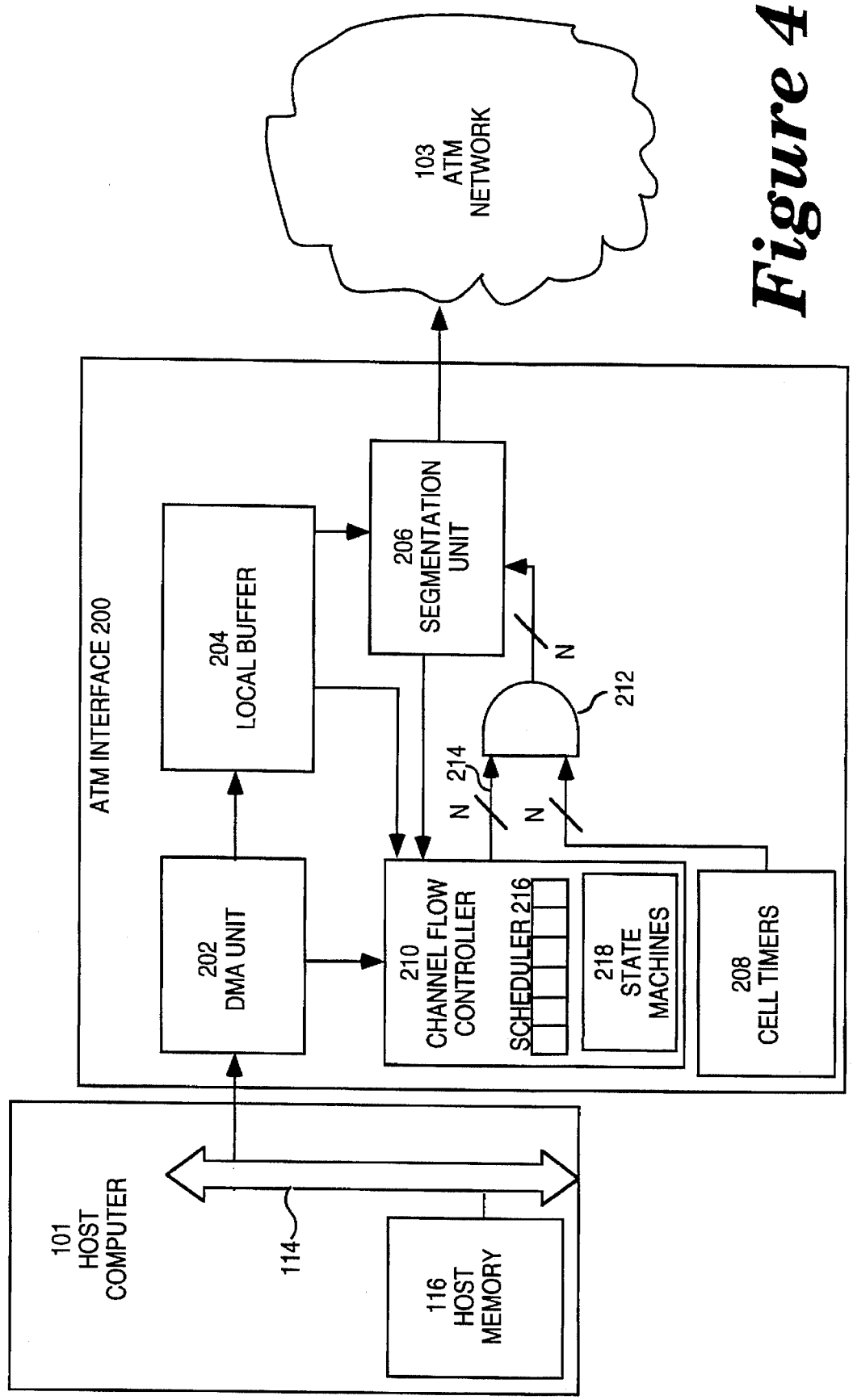
FIG. 4 is a block diagram illustrating the transmit circuitry of a network interface circuit according to one embodiment of the invention.

Referring to FIG. 4, it is a block diagram illustrating transmit circuitry 200 of a network interface circuit 12 according to one embodiment of the invention. In addition to a DMA unit 202, a local buffer 204, a segmentation unit 206 and cell timers 208, transmit circuitry 200 includes a channel flow controller 210 and a set of AND gates 212. Channel flow controller 210 includes a scheduler 216 and a plurality of state machines 218. Each of state machines 218 corresponds to a particular channel supported by transmit circuitry 200. For each channel supported by transmit circuitry 200, channel flow controller 210 is configured to generate an enable signal based on the current state of the state machine 218 for the channel. Scheduler 216 and state machines 218 shall be described in greater detail below.

Channel flow controller 210 is coupled to AND gates 212 by a plurality of lines 214. Each of lines 214 corresponds to a particular channel supported by transmit circuitry 200. Channel flow controller 210 transmits the enable signal for each of the various channels over the line 214 that corresponds to the channel.

AND gates 212 correspond to the channels supported by transmit circuitry 200. The inputs of the AND gate for a given channel are coupled to the cell timer 208 for that channel and to the line 214 that is associated with that channel. If the line 214 associated with a channel carries an enable signal, then the cell transmit requests from the cell timer 208 associated with the channel pass through the corresponding AND gate 212 and are received by segmentation unit 206. If the line 214 associated with a channel does not carry an enable signal, then the cell transmit requests from the cell timer 208 associated with the channel do not pass through the corresponding AND gate 212 and are not received by segmentation unit 206.

FLOW CONTROL STATE MACHINE

Figure 5:
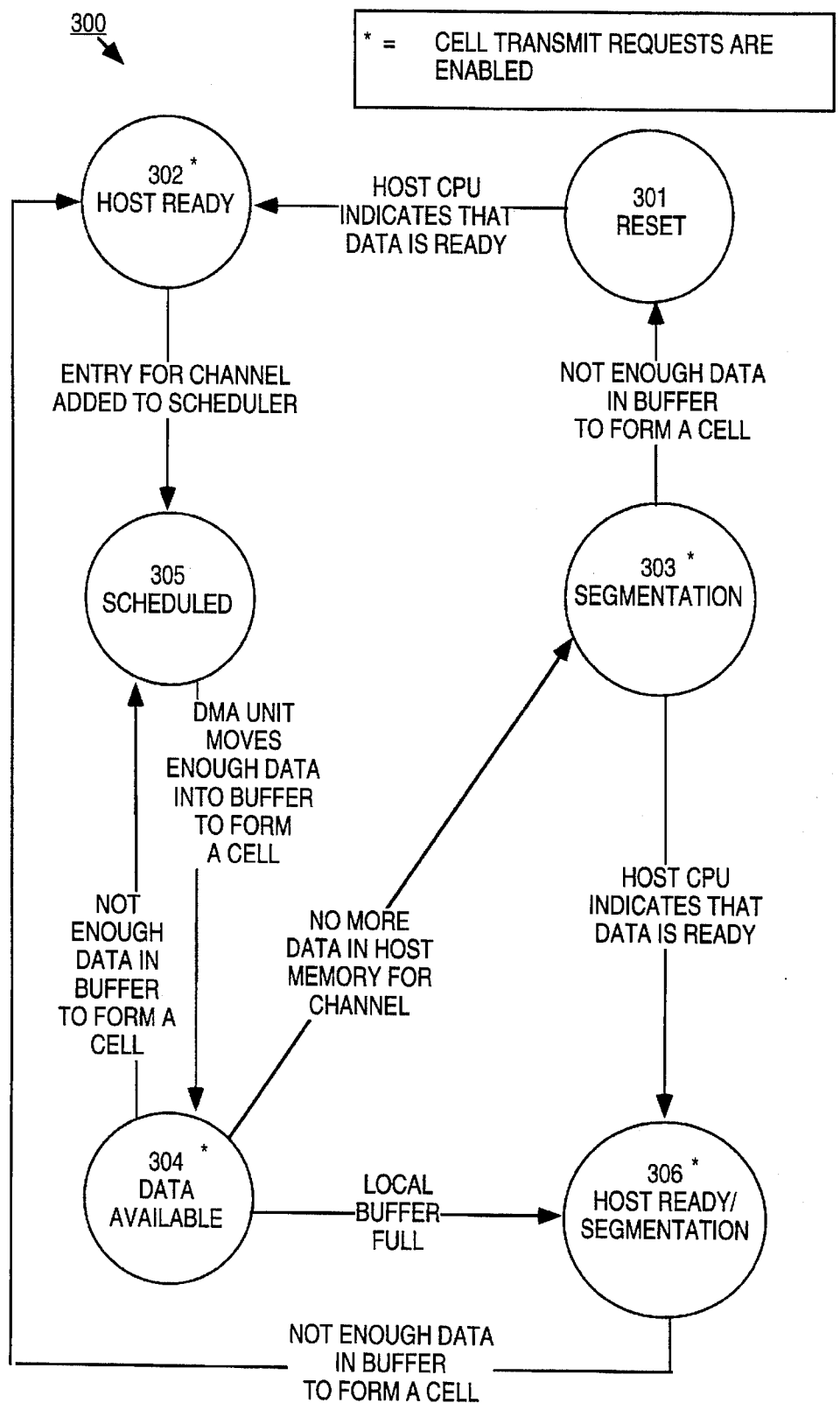
FIG. 5 illustrates a channel flow control state machine used by the transmit circuitry to control the flow of data for each channel from the host computer to the ATM network according to an embodiment of the invention.

Referring to FIG. 5, it illustrates a channel flow control state machine 300. Channel flow control state machine 300 includes a plurality of states, including a reset state 301, a host ready state 302, a segmentation state 303, a data available state 304, a scheduled state 305 and a host ready/segmentation state 306. State machine 300 moves from state to state in response to events that occur within transmit circuitry 200. According to one embodiment of the invention, channel flow controller 210 includes a state machine 300 for each channel supported by transmit circuitry 200.

By providing a state machine 300 for each ATM channel, channel flow controller 210 avoids the flow problems described above with reference to ATM interface 100. Specifically, channel flow controller 210 prevents the segmentation unit 206 from receiving requests to transmit cells for channels when there is not enough data in local buffer 204 to construct cells for the channels. Further, channel flow controller 210 prevents DMA unit 202 from performing DMA transfers from host memory 116 to local buffer 204 for a particular channel when the memory within local buffer 204 that is dedicated to storing data for the channel is almost full. In addition, channel flow controller 210 allows for deferred DMA transfers by providing a mechanism for remembering when data for a channel is ready for transfer from the host memory 116 into the local buffer 104.

INSUFFICIENT BUFFERED DATA CONDITIONS

State machine 300 is configured so that the enable signal for a channel is asserted only when (1) there is enough data in local buffer 204 for segmentation unit 206 to transmit a cell for the channel or (2) a DMA transfer for the channel is to be scheduled. Consequently, segmentation unit 206 does not waste time servicing cell transmit requests for channels when there is not enough data to transmit cells for the channels.

As mentioned above, channel flow controller 210 generates an enable signal to enable requests to the segmentation unit 206 for a particular channel based on the state of the state machine 300 associated with the channel. In the illustrated embodiment, channel flow controller 210 asserts an enable signal for the channel associated with state machine 300 when state machine 300 is in the segmentation state 303, the data available state 304, the host ready state 302 and the host ready/segmentation state 306. Channel flow controller 210 does not assert an enable signal for the channel associated with state machine 300 when state machine 300 is in the reset state 301 or the scheduled state 305.

For the purposes of explanation, it shall be assumed that state machine 300 corresponds to a channel "1" supported by transmit circuitry 200 and that state machine 300 is initially in scheduled state 305. As shall be described hereafter, when state machine 300 is in the scheduled state, the host computer 101 has requested DMA unit 202 to move a particular block of data for channel "1" from host memory 116 into the local buffer 204, but the local buffer 204 does not yet contain enough data for a cell to be constructed for channel "1".

Channel flow controller 210 monitors local buffer 204 to detect when the DMA unit 202 has moved enough data into local buffer 204 for a cell to be constructed for channel "1". When enough data for a cell to be constructed for channel "1" has been moved into local buffer 204, the channel flow control state machine 300 moves from the scheduled state 305 into a data available state 304.

As noted above, the channel flow controller 210 asserts an enable signal for channel "1" when state machine 300 is in the data available state 304. While the enable signal is asserted, cell transmit requests made by the cell timer 208 associated with channel "1" pass through the corresponding AND gate 212 and are received by segmentation unit 206. In response to such request signals, segmentation unit 206 constructs cells for channel "1" from the data contained in local buffer 204 and transmits the cells onto ATM network 103.

Channel flow controller 210 monitors DMA unit 202 to detect when DMA unit 202 has finished moving the block of data for channel "1" from host memory 116 to local buffer 204. Once the DMA unit 202 has moved the entire block of data for channel "1" from the host memory 116 to the local buffer 204, the channel flow control state machine 300 enters the segmentation state 303. While state machine 300 is in the segmentation state 303, requests to the segmentation unit 206 for the transmission of cells for channel "1" are still enabled.

While state machine 300 is in the segmentation state 303, channel flow controller 210 monitors local buffer 204 to detect when all of the data for channel "1" has been transmitted by segmentation unit 206 to ATM network 103. When the segmentation unit 206 has transmitted all the available data for channel "1", the channel flow control state machine 300 moves into a reset state 301. While state machine 300 is in the reset state 301, the enable signal for channel "1" is not asserted. Consequently, requests for the transmission of cells on channel "1" do not pass through AND gates 2 12 to reach the segmentation unit 206.

If the portion of local buffer 204 that has been allocated for channel "1" data becomes full before the entire block of data for channel "1" has been transferred from the host memory 116, then state machine 300 moves from the data available state 304 to host ready/segmentation state 306. While state machine 300 is in the host ready/segmentation state 306, requests to the segmentation unit 206 for the transmission of cells for channel "1" are still enabled. However, DMA unit 202 ceases to transfer data for channel "1" into local buffer 204.

While state machine 300 is in the host ready/segmentation state 306, data is being transmitted from but not moved into the portion of local buffer 204 allocated to channel "1". Consequently, the amount of data in the portion of local buffer 204 allocated to channel "1" will decrease. When the amount of data in the portion of local buffer 204 allocated to channel "1" fails below a predetermined threshold, state machine 300 enters the host ready state 302.

In the host ready state 302, there is not enough data in the local buffer 204 to transmit a cell for channel "1", and there is data for channel "1" in host memory 116 waiting to be moved into local buffer 204. Under these conditions, a DMA transfer for channel "1" should be scheduled by segmentation unit 206. To cause segmentation unit 206 to schedule the desired DMA transfer, the enable signal for channel "1" is asserted in the host ready state 302 even though there is not enough data in the local buffer 204 to transmit a cell for channel "1". Scheduling shall be described in greater detail below.

ALMOST-FULL BUFFER CONDITIONS

As explained above, it is inefficient for the DMA unit 202 to initiate a data transfer operation for a channel when the portion of the local buffer 204 that is allocated to the channel is almost full. To ensure that DMA unit 202 does not initiate inefficient data transfer operations, DMA unit 202 is configured to perform transfers based on the scheduler 216.

The scheduler 216 is a queue, where each entry in the queue identifies a channel number. According to one embodiment of the invention, DMA unit 202 is configured to sequentially read and process the entries in scheduler 216. The DMA unit 202 processes an entry by transferring data for the channel identified in the entry from the host memory 116 to the local buffer 204. For example, in response to reading an entry from the scheduler 216 that identifies channel "1", DMA unit 202 would transfer data for channel "1" from host memory 116 into the portion of local buffer 204 that corresponds to channel "1".

Segmentation unit 206 is configured to insert entries into scheduler 216 under certain conditions. Specifically, the segmentation unit 206 inserts an entry that identifies a particular channel into the scheduler 216 when (1) state machine 300 is in the host ready state 302 and (2) the segmentation unit 206 detects that space within local buffer 204 that is allocated to a particular channel is almost empty. Specifically, when state machine 300 is in the host ready state 302, segmentation unit 206 still receives requests to transmit cells for channel "1" even though local buffer 204 does not contain enough data to construct a cell for channel "1". When segmentation unit 206 receives a request to service channel "1", segmentation unit 206 detects that state machine 300 is in the host ready state 302 and therefore knows to schedule a DMA operation for channel "1" by inserting an entry for channel "1" into scheduler 216 rather than attempt to transmit a cell for channel "1".

At the same time that the segmentation unit 206 inserts an entry for channel "1" into the scheduler 216, the channel flow control state machine 300 moves from the host ready state 302 to the scheduled state 305. While the channel flow control state machine 300 remains in the scheduled state 305, the segmentation unit 206 does not to schedule any more DMA activity for channel "1" and transmit requests for channel "1" are not enabled.

DMA unit 202 sequentially services the entries in scheduler 216. Eventually, the entry for channel "1" will move to the head of scheduler 216 to be serviced by DMA unit 202. To service the entry for channel "1", DMA unit 202 will moved data for channel "1" from host memory 116 to local buffer 204.

State machine 300 remains in the scheduled state 305 until DMA unit 202 has moved enough data from host memory 116 to the local buffer 204 for segmentation unit 206 to construct a cell for channel "1". When channel flow controller 210 detects that the channel "1" portion of local buffer 204 contains enough data to form a cell, state machine 300 moves from the scheduled state 305 to the data available state 304, as described above.

As explained above, the DMA unit 202 performs transfer operations for the channels identified in scheduler 216. Because the channels identified in scheduler 216 are channels for which little or no data remains in local buffer 204, DMA unit 202 only begins data movement for the channels whose portion of the local buffer 204 is empty or almost empty. Consequently, DMA unit 202 does not waste time initiating transfers for channels whose portion of the local buffer 204 is almost full.

DEFERRED TRANSFERS

As mentioned above, DMA unit 202 services the channels identified in the entries of scheduler 216. While DMA unit 202 is performing a data transfer for the channel at the head of scheduler 216, host computer 101 may request a data transfer from host memory 116 to local buffer 204 for a different channel. Because DMA unit 202 is busy with a different data transfer operation, it cannot immediately service the requests of the host computer 101.

Consequently, the channel flow controller 210 is configured to "remember" that the host computer 101 has data ready for a channel by causing the state machine for the channel to enter a host ready state whenever there is data in the host memory 116 that needs to be moved to the local buffer 204 for that channel. Specifically, when channel flow controller 210 detects a request made by host computer 101 to transfer data from host memory 116 to local buffer 204, the channel flow control state machine that corresponds to the channel identified in the request assumes a host ready state.

In the illustrated embodiment, each state machine has two host ready states: host ready state 302 and host ready/segmentation state 306. State machine 300 assumes host ready/segmentation state 306 in response to a request to transfer data for channel "1" when state machine 300 is currently in the segmentation state 303. State machine 300 assumes host ready state 302 in response to a request to transfer data for channel "1" when state machine 300 is currently in the reset state 301. State machine 300 also assumes host ready state 302 when the portion of the local buffer associated with channel "1" is almost empty and state machine 300 is currently in host ready/segmentation state 306.

In the host ready state 302, requests to the segmentation unit 206 are enabled even though there is not enough data in local buffer 204 to construct a cell for channel "1". When the segmentation unit 206 services the request, the segmentation unit 206 detects that state machine 300 is in the host ready state 302 and inserts an entry that identifies channel "1" into the scheduler 216. When the entry identifying channel "1" has been inserted into scheduler 216, the channel flow control state machine 300 enters the scheduled state 305.

STATE MACHINE OVERVIEW

Table 1 summarizes the states provided by each of state machines 218. Table 2 summarizes the events which cause a state machine to move from one state to another. By using state machines 218 that function to control the flow of data through transmit circuitry 200 in the described manner, inefficient data transfer conditions are avoided. Specifically, DMA unit 202 does not attempt to fill local buffer 204 for channels when little room is left in local buffer 204 for the channels, and segmentation unit 206 does not attempt to transmit cells for channels when there is not enough data in local buffer 204 to construct cells for the channels.

TABLE 1

| STATE | CONDITIONS |
|---|---|
| RESET 301 | Local buffer 204 does not contain enough data to transmit a cell for the channel. |
| | Host memory 116 does not currently have data for the channel. |
| | A DMA transfer has not been scheduled for the channel. |
| | Cell transmit requests are not enabled for the channel. |
| HOST READY 302 | Local buffer 204 does not contain enough data to transmit a cell for the channel. |
| | Host memory 116 has data for the channel. |
| | A DMA transfer has not been scheduled for the channel. |
| | Cell transmit requests are enabled. |
| SEGMENTATION 303 | Local buffer 204 contains enough data to transmit a cell for the channel. |
| | Host memory 116 does not currently have data for the channel. |
| | A DMA transfer has not been scheduled for the channel. |
| | Cell transmit requests are enabled for the channel. |
| DATA AVAILABLE 304 | Local buffer 204 contains enough data to transmit a cell for the channel. |
| | Data for the channel is being transferred from host memory 116 to the local buffer 204. |
| | Cell transmit requests are enabled for the channel. |
| SCHEDULED 305 | Local buffer 204 does not contain enough data to transmit a cell for the channel. |
| | Host memory 116 currently has data for the channel. |
| | A DMA transfer has been scheduled for the channel. |
| | Cell transmit requests are not enabled for the channel. |
| HOST READY/ SEGMENTATION 306 | Local buffer 204 contains enough data to transmit a cell for the channel. |
| | Host memory 116 currently has data for the channel. |
| | A DMA transfer has not been scheduled for the channel. |
| | Cell transmit requests are enabled for the channel. |

TABLE 2

| FROM STATE: | TO STATE: | EVENT: |
|---|---|---|
| HOST READY 302 | SCHEDULED 305 | Segmentation unit 206 places an entry for the channel in scheduler 216. |
| SCHEDULED 305 | DATA AVAILABLE 304 | DMA unit 202 moves enough data into local buffer 204 to construct a cell for the channel. |
| DATA AVAILABLE 304 | SCHEDULED 305 | The amount of data contained |

TABLE 2-continued

| FROM STATE: | TO STATE: | EVENT: |
|---|---|---|
| | | in local buffer 204 for the channel falls below the amount required to construct a cell for the channel. |
| DATA AVAILABLE 304 | SEGMENTATION 303 | DMA unit 202 finishes transferring all of the data for the channel from host memory 116 to local buffer 204. |
| DATA AVAILABLE 304 | HOST READY/ SEGMENTATION 306 | The portion of the local buffer allocated to the channel becomes full. |
| HOST READY/ SEGMENTATION 306 | HOST READY 302 | The amount of data contained in local buffer 204 for the channel falls below the amount required to construct a cell for the channel. |
| SEGMENTATION 303 | RESET 301 | The amount of data contained in local buffer 204 for the channel falls below the amount required to contruct a cell for the channel. |
| SEGMENTATION 303 | HOST READY/ SEGMENTATION 306 | The host computer 101 indicates that data for the channel is available for transfer from host memory 116. |
| RESET 301 | HOST READY 302 | The host computer 101 indicates that data for the channel is available for transfer from host memory 116. |

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for controlling a flow of data between a host computer and a network, the apparatus comprising:
   a local buffer for storing data to be transmitted onto said network;
   a timer that corresponds to a channel, the timer being configured to generate cell transmit requests;
   a channel flow controller coupled to said timer, said channel flow controller configured to generate an enable signal associated with said channel when said local buffer contains at least a first amount of data for said channel;
   a segmentation unit coupled to said timer, said channel flow controller and said local buffer, said segmentation unit configured to respond to said cell transmit requests from said timer if and only if said channel flow controller is generating said enable signal, said segmentation unit configured to read data from said local buffer and to transmit said data in cells onto said network on said channel in response to said cell transmit requests from said timer.

2. The apparatus of claim 1 wherein said channel flow controller generates said enable signal when said local buffer does not contain at least said first amount of data if and only if said host computer contains data to be sent on said channel and said data is not currently being transferred from said host computer to said local buffer.

3. The apparatus of claim 1 wherein said first amount of data is an amount of data required to construct a cell for said channel.

4. The apparatus of claim 2 further comprising:
   a scheduler queue that contains entries that identify channels for transmitting data on said network; and
   a DMA unit coupled to said host computer, said scheduler queue and said local buffer, said DMA unit configured to read said entries in said scheduler queue and to transfer data for the channels identified in said entries from said host computer to said local buffer.

5. The apparatus of claim 4 wherein said segmentation unit is configured to add an entry identifying said channel to said scheduler queue when said host computer contains data to be sent on said channel, said data is not currently being transferred from said host computer to said local buffer, and said local buffer does not contain at least said first amount of data.

6. The apparatus of claim 1 wherein said channel has a desired data transfer rate, said timer being configured to generate said cell transmit requests at a rate that corresponds to said desired data transfer rate.

7. A state machine associated with a channel for controlling a flow of data for said channel from a host computer to an ATM network, the state machine having:
   a scheduled state in which
      data to be sent on said channel is copied from the host computer into a local buffer; and
      cells for said channel are not constructed from data stored in the local buffer;
   a data available state in which cells for said channel are constructed from data stored in said local buffer and transmitted onto said ATM network;
   said state machine being configured to move from said scheduled state to said data available state when said local buffer contains an amount of data for said channel that exceeds a first predetermined threshold; and
   a segmentation state in which
      data to be sent on said channel is not copied from the host computer into said local buffer; and cells for said channel are constructed from data stored in said local buffer and transmitted onto said ATM network;

said state machine being configured to move from said data available state to said segmentation state when all of the data in said host computer that is to be sent on said channel has been copied into said local buffer.

8. The state machine of claim 7 wherein a portion of said local buffer is allocated for said channel, said state machine further comprising:

a host ready/segmentation state in which
data to be sent on said channel is not copied from the host computer into said local buffer; and
cells for said channel are constructed from data stored in said local buffer and transmitted onto said ATM network; and said state machine being configured to move from said data available state to said host ready/segmentation state when said portion of said local buffer that is allocated for said channel becomes full before all of the data in said host computer that is to be sent on said channel has been copied into said local buffer.

9. The state machine of claim 7 further comprising:

a reset state in which
data to be sent on said channel is not copied from the host computer into said local buffer; and
cells for said channel not are constructed from data stored in said local buffer; and said state machine being configured to move from said segmentation state to said reset state when said local buffer contains an amount of data for said channel that falls below a second predetermined threshold.

10. The state machine of claim 9 wherein said first predetermined threshold and said second predetermined threshold equal the amount of data required to form a cell.

11. The state machine of claim 7 further comprising:

a host ready state in which
data to be sent on said channel is not copied from the host computer into said local buffer;
said local buffer contains insufficient data for said channel for cells to be constructed for said channel; and
an operation is scheduled for transferring data for said channel from said host computer to said local buffer;

said state machine being configured to move from said host ready state to said scheduled state when said operation is scheduled.

12. The state machine of claim 11 further comprising:

a reset state in which
data to be sent on said channel is not copied from the host computer into said local buffer; and
cells for said channel not are constructed from data stored in said local buffer; and said state machine being configured to move from said reset state to said host ready state when said host computer indicates that data for said channel is ready to be transferred from said host computer to said local buffer.

13. A method for controlling a flow of data for a channel from a host computer to an ATM network, the method comprising the steps of:

causing a state machine to move from a scheduled state to a data available state when a local buffer contains an amount of data for said channel that exceeds a first predetermined threshold;

if said state machine is in said scheduled state, then performing the step of
copying data to be sent on said channel from the host computer into said local buffer; and if said state machine is in said data available state, then performing the steps of
constructing cells for said channel from data stored in said local buffer; and
transmitting said cells onto said ATM network; and causing said state machine to move from said data available state to a segmentation state when all of the data in said host commuter that is to be sent on said channel has been copied into said local buffer;

if said state machine is in said segmentation state, then performing the steps of
ceasing to copy data to be sent on said channel from the host computer into said local buffer; and
continuing to construct cells for said channel from data stored in said local buffer and transmitted onto said ATM network.

14. The method of claim 13 wherein a portion of said local buffer is allocated for said channel, said method further comprising the steps of:

causing said state machine to move from said data available state to a host ready/segmentation state when said portion of said local buffer that is allocated for said channel becomes full before all of the data in said host computer that is to be sent on said channel has been copied into said local buffer; and if said state machine is in said host ready/segmentation state, then performing the steps of
ceasing to copy data to be sent on said channel from the host computer into said local buffer; and
continuing to construct cells for said channel from data stored in said local buffer and transmitted onto said ATM network.

15. The method of claim 13 further comprising the steps of:

causing said state machine to move from said segmentation state to a reset state when said local buffer contains an amount of data for said channel that falls below a second predetermined threshold; and if said state machine is in said reset state, then performing the step of
ceasing to construct cells for said channel from data stored in said local buffer.

16. The method of claim 15 wherein said first predetermined threshold and said second predetermined threshold equal the amount of data required to form a cell.

17. The method of claim 13 further comprising the steps of:

causing said state machine to move from a host ready state to said scheduled state when an operation is scheduled for transferring data for said channel from said host computer to said local buffer;

if said state machine is in said host ready state, then performing the step of
scheduling said operation for transferring data for said channel from said host computer to said local buffer.

18. The method of claim 17 further comprising the steps of:

causing said state machine to move from a reset state to said host ready state when said host computer indicates that data for said channel is ready to be transferred from said host computer to said local buffer; and if said state machine is in said reset state, then performing the steps of monitoring said host computer to detect when data for said channel is ready to be transferred from said host computer to said local buffer.

19. A state machine associated with a channel for controlling a flow of data for said channel from a host computer to an ATM network, the state machine having a plurality of states, said state machine being configured to move from a current state to a next state of said plurality of states when each of the following occurs:

an operation is scheduled for transferring data for said channel from said host computer to a local buffer;

said host computer indicates that data for said channel is ready to be transferred from said host computer to said local buffer;

all of the data in said host computer that is to be sent on said channel has been copied into said local buffer;

a portion of said local buffer that is allocated for said channel becomes full before all of the data in said host computer that is to be sent on said channel has been copied into said local buffer;

said local buffer contains an amount of data for said channel that exceeds a first predetermined threshold; and said local buffer contains an amount of data for said channel that falls below a second predetermined threshold.

20. A computer system configured to communicate over a network, the computer system comprising:

a host memory;

a system bus coupled to said host memory; and a network interface coupled to said system bus for controlling a flow of data between the host memory and the network, the network interface comprising:

a local buffer for storing data to be transmitted onto said network;

a timer that corresponds to a channel, the timer being configured to generate cell transmit requests;

a channel flow controller coupled to said timer, said channel flow controller configured to generate an enable signal associated with said channel when said local buffer contains at least a first amount of data for said channel;

a segmentation unit coupled to said timer, said channel flow controller and said local buffer, said segmentation unit configured to respond to said cell transmit requests from said timer if and only if said channel flow controller is generating said enable signal, said segmentation unit configured to read data from said local buffer and to transmit said data in cells onto said network on said channel in response to said cell transmit requests from said timer.

21. The computer system of claim 20 wherein said channel flow controller generates said enable signal when said local buffer does not contain at least said first amount of data if and only if said host memory contains data to be sent on said channel and said data is not currently being transferred from said host memory to said local buffer.

22. The computer system of claim 20 wherein said first amount of data is an amount of data required to construct a cell for said channel.

23. The computer system of claim 21 further comprising:

a scheduler queue that contains entries that identify channels for transmitting data on said network; and a DMA unit coupled to said host memory by said system bus, said scheduler queue and said local buffer, said DMA unit configured to read said entries in said scheduler queue and to transfer data for the channels identified in said entries from said host memory to said local buffer.

24. The computer system of claim 23 wherein said segmentation unit is configured to add an entry identifying said channel to said scheduler queue when said host memory contains data to be sent on said channel, said data is not currently being transferred from said host memory to said local buffer, and said local buffer does not contain at least said first amount of data.

25. The computer system of claim 20 wherein said channel has a desired data transfer rate, said timer being configured to generate said cell transmit requests at a rate that corresponds to said desired data transfer rate.

* * * * *

UNITED STATES PATENT AND TRADEMARK OFFICE
CERTIFICATE OF CORRECTION

PATENT NO.    : 5,633,870
DATED         : May 27, 1997
INVENTOR(S)   : Gaytan et al.

It is certified that error appears in the above-identified patent and that said Letters Patent is hereby corrected as shown below:

Column 14,
Line 13, please delete "commuter" and insert -- computer --.

Signed and Sealed this

Sixteenth Day of July, 2002

Attest:

JAMES E. ROGAN
Attesting Officer      Director of the United States Patent and Trademark Office